United States Patent
Tiwari et al.

(10) Patent No.: US 11,152,787 B2
(45) Date of Patent: Oct. 19, 2021

(54) SYSTEM OF MODULAR REACTIVE POWER COMPENSATORS

(71) Applicant: General Electric Company, Schenectady, NY (US)

(72) Inventors: Arvind Kumar Tiwari, Niskayuna, NY (US); Jayanti Navilgone Ganesh, Karnataka (IN); Kasi Viswanadha Raju Gadiraju, Karnataka (IN); Robert Gregory Wagoner, Roanoke, VA (US); Harmeet Singh Narang, Clarksville, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 16/740,108

(22) Filed: Jan. 10, 2020

(65) Prior Publication Data
US 2021/0218245 A1    Jul. 15, 2021

(51) Int. Cl.
  *H02J 3/18*   (2006.01)
  *H02J 3/38*   (2006.01)
  *H02K 7/18*   (2006.01)

(52) U.S. Cl.
  CPC ............... *H02J 3/18* (2013.01); *H02J 3/381* (2013.01); *H02K 7/183* (2013.01)

(58) Field of Classification Search
  CPC ............. H02J 3/18; H02J 3/381; H02K 7/183
  See application file for complete search history.

(56) References Cited

U.S. PATENT DOCUMENTS

| 7,245,037 B2 | 7/2007 | Aengquist et al. |
| 8,912,675 B2 | 12/2014 | Mata Dumenjo et al. |
| 9,293,922 B2 | 3/2016 | Divan et al. |
| 2006/0214643 A1* | 9/2006 | Angquist ............... H02J 3/1835 322/17 |
| 2012/0306277 A1* | 12/2012 | Garcia ................... H02J 3/1885 307/82 |

(Continued)

FOREIGN PATENT DOCUMENTS

| CN | 1 588 746 A | 3/2005 |
| CN | 203553941 U | 4/2014 |
| CN | 204905878 U | 12/2015 |

(Continued)

OTHER PUBLICATIONS

Masaud et al., "A Comparative Study of the Implementation of STATCOM and SVC on DFIG-Based Wind Farm Connected to a Power System", 2012 IEEE Power and Energy Society General Meeting, pp. 1-1, Canada, Jul. 22-26, 2012.

(Continued)

*Primary Examiner* — Tulsidas C Patel
*Assistant Examiner* — Joseph Ortega
(74) *Attorney, Agent, or Firm* — Dority & Manning, P.A.

(57) ABSTRACT

A system of reactive power compensators for a wind farm includes a multi-winding transformer and a plurality of modular reactive power compensators (MVBs). The multi-winding transformer includes a primary winding and a plurality of secondary windings. The primary winding is configured to be coupled to a point of common coupling (POCC) for the wind farm. The plurality of MVBs are each coupled to a corresponding winding of the plurality of secondary windings.

18 Claims, 7 Drawing Sheets

(56) References Cited

U.S. PATENT DOCUMENTS

2019/0280586 A1* 9/2019 Chen .................. H02M 7/4807

FOREIGN PATENT DOCUMENTS

| CN | 106451483 A | 2/2017 |
| --- | --- | --- |
| WO | WO 2011/091267 A2 | 7/2011 |
| WO | WO 2011/104270 A2 | 9/2011 |
| WO | WO 2018/202279 A1 | 11/2018 |

OTHER PUBLICATIONS

Xu et al., "Improvement of Power Quality and Dynamic Voltage of Wind Farms Using an Inductive Filtering Method", 2015 IEEE 15th International Conference on Environment and Electrical Engineering (EEEIC), pp. 1611-1615, Italy, Jun. 10-13, 2015.
Vegunta et al., "Reactive Power Compensation Solutions and Reactive Power Source Priority Impact on Wind Farm Losses", 2017 IEEE Manchester PowerTech, pp. 1-5, Jun. 18-22, 2017.
EPO Search Report, dated May 11, 2021.

* cited by examiner

SYSTEM OF MODULAR REACTIVE POWER COMPENSATORS

BACKGROUND

The field of the disclosure relates generally to modular reactive power compensators and, more particularly, to a system of modular reactive power compensators for a wind farm.

As renewable power has prevailed, requirements for connecting renewable power sources to the electric grid, i.e., grid codes, have evolved and become more complex, and therefore more demanding on operators of renewable power sources, such as, for example, wind farms. Generally, grid codes specify operating standards including, for example, active and reactive power control, power factor control, voltage and current waveform quality, response to grid-side frequency and voltage variation, and ride-through capability in the event of a grid-side fault.

Within a wind farm, a wind turbine turns a generator, e.g., a doubly fed induction generator (DFIG), that generates electric power that is supplied to the grid through a point of common coupling (POCC). Within a given wind farm having many generators, each generates power at a generation voltage that is stepped-up to be supplied to the POCC. Voltage on the POCC is typically stepped-up further to transmission line voltage before being supplied to the grid itself. Wind farms may incorporate one or more reactive power compensators (each referred to as a VAR compensator) to help comply with local grid codes. One such device is a static synchronous compensator (STATCOM) that can be connected at the POCC or at the turbine to stabilize voltage. When integrating at the POCC, for example, a single VAR compensator may be designed to comply with local grid codes. In the alternative, one or more modular VAR compensators, or "Modular VAR Box" (MVB), can be connected to the POCC in whatever quantity is needed to comply with local grid codes.

BRIEF DESCRIPTION

In one aspect, a system of reactive power compensators for a wind farm is provided. The system includes a multi-winding transformer and a plurality of modular reactive power compensators (MVBs). The multi-winding transformer includes a primary winding and a plurality of secondary windings. The primary winding is configured to be coupled to a point of common coupling (POCC) for the wind farm. The plurality of MVBs are each coupled to a corresponding winding of the plurality of secondary windings.

In another aspect, a wind farm is provided. The wind farm includes a POCC, a plurality of doubly-fed induction generators (DFIGs), a multi-winding transformer, and a plurality of MVBs. The POCC is configured to be coupled to an electric grid. The plurality of DFIGs is configured to generate alternating current (AC) power to be supplied to the POCC. The multi-winding transformer includes a primary winding and a plurality of secondary windings. The primary winding is configured to be coupled to the POCC for the wind farm. Each of the plurality of MVBs is coupled to a corresponding winding of the plurality of secondary windings.

In yet another aspect, a method of operating a wind farm is provided. The method includes supplying, by a plurality of DFIGs coupled to corresponding wind turbines, AC power to a POCC configured to be coupled to an electric grid. The method includes coupling a primary winding of a multi-winding transformer to the POCC. The method includes coupling a plurality of MVBs to the POCC through a corresponding winding of a plurality of secondary windings of the multi-winding transformer.

DRAWINGS

These and other features, aspects, and advantages of the present disclosure will become better understood when the following detailed description is read with reference to the accompanying drawings in which like characters represent like parts throughout the drawings, wherein.

Figure 1:
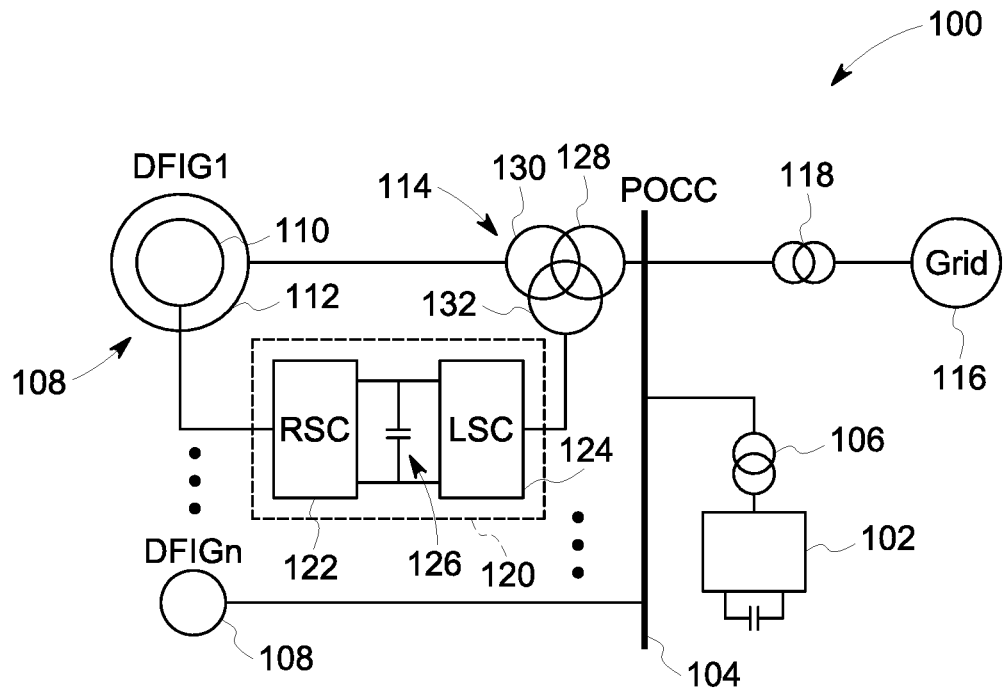
FIG. 1 is a diagram of an exemplary wind farm with a single VAR compensator.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, a number of terms are referenced that have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it relates. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

Some embodiments involve the use of one or more electronic processing or computing devices. As used herein, the terms "processor" and "computer" and related terms, e.g., "processing device," "computing device," and "controller" are not limited to just those integrated circuits referred to in the art as a computer, but broadly refers to a processor, a processing device, a controller, a general purpose central processing unit (CPU), a graphics processing unit (GPU), a microcontroller, a microcomputer, a programmable logic controller (PLC), a reduced instruction set computer (RISC) processor, a field programmable gate array (FPGA), a digital signal processing (DSP) device, an application specific integrated circuit (ASIC), and other programmable circuits or processing devices capable of executing the functions described herein, and these terms are used interchangeably herein. The above embodiments are examples only, and thus are not intended to limit in any way the definition or meaning of the terms processor, processing device, and related terms.

In the embodiments described herein, memory may include, but is not limited to, a non-transitory computer-readable medium, such as flash memory, a random access memory (RAM), read-only memory (ROM), erasable programmable read-only memory (EPROM), electrically erasable programmable read-only memory (EEPROM), and non-volatile RAM (NVRAM). As used herein, the term "non-transitory computer-readable media" is intended to be representative of any tangible, computer-readable media, including, without limitation, non-transitory computer storage devices, including, without limitation, volatile and non-volatile media, and removable and non-removable media such as a firmware, physical and virtual storage, CD-ROMs, DVDs, and any other digital source such as a network or the Internet, as well as yet to be developed digital means, with the sole exception being a transitory, propagating signal. Alternatively, a floppy disk, a compact disc-read only memory (CD-ROM), a magneto-optical disk (MOD), a digital versatile disc (DVD), or any other computer-based device implemented in any method or technology for short-term and long-term storage of information, such as, computer-readable instructions, data structures, program modules and sub-modules, or other data may also be used. Therefore, the methods described herein may be encoded as executable instructions, e.g., "software" and "firmware," embodied in a non-transitory computer-readable medium. Further, as used herein, the terms "software" and "firmware" are interchangeable, and include any computer program stored in memory for execution by personal computers, workstations, clients and servers. Such instructions, when executed by a processor, cause the processor to perform at least a portion of the methods described herein. Furthermore, as used herein, the term "real-time" refers to at least one of the time of occurrence of the associated events, the time of measurement and collection of predetermined data, the time to process the data, and the time of a system response to the events and the environment. In the embodiments described herein, these activities and events occur substantially instantaneously.

Conventionally, a system of modular reactive power compensators (each referred to as a modular VAR box, or MVB) can be operated in a master-slave mode in which a top-level controller commands each MVB to operate, for example, in a voltage-control mode or a reactive power-control mode, or to go into standby mode or power-off when their support is not needed. If such master-slave control methodology is not followed and multiple VAR boxes are integrated without significant impedance in the system, it can result in interaction among the various MVBs. The interactions among their internal control loops can result in, for example, circulating currents and oscillatory reactive power. These issues may be overcome with additional communication and coordination (such as master-slave architecture) among the MVBs, but with greater expense and complexity for wind farm operators.

Embodiments of the systems and methods described herein provide an architecture for connecting a system of MVBs without additional communication among the MVBs. The systems and methods described herein provide integration of multiple MVBs through a multi-winding transformer coupled between the POCC and each MVB. More specifically, each MVB couples to the POCC through its own corresponding secondary winding of the multi-winding transformer. In certain embodiments, the voltage on the POCC is stepped-down by the multi-winding transformer to an operating voltage for the multiple MVBs. The leakage inductance of the multi-winding transformer acts as a high impedance path for the high-frequency circulating current and isolates the circulating current among the MVB converters. This avoids reactive power oscillations in the connection path and also at the PCC.

Figure 2:
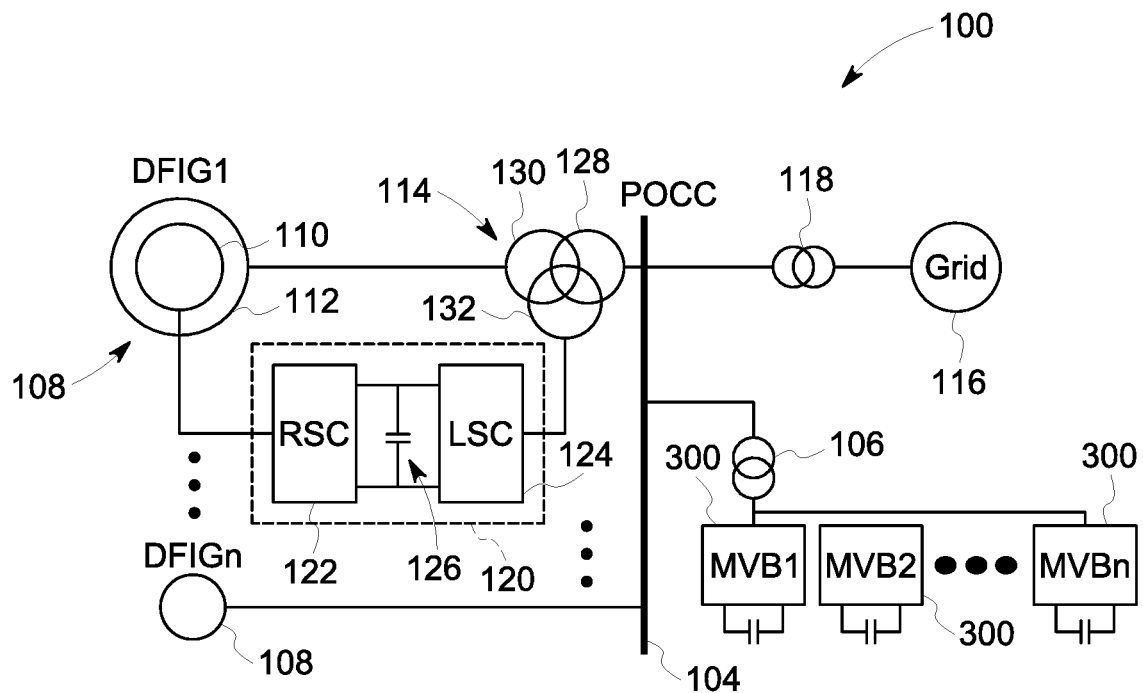
FIG. 2 is a diagram of the wind farm of FIG. 1 with a plurality of modular VAR compensators.

FIG. 1 is a diagram of an example wind farm 100 including a single VAR compensator 102. Wind farm 100 includes a POCC 104 to which VAR compensator 102 couples through a transformer 106. FIG. 2 is a diagram of wind farm 100 (shown in FIG. 1) including a plurality of MVBs 300 in place of single VAR compensator 102. Referring to both FIG. 1 and FIG. 2, wind farm 100 includes a plurality of DFIGs 108, referred to as DFIGs 1 to n. Each DFIG 108 includes a rotor 110 and a stator 112. Each DFIG 108 is turned, through a gear box, by a turbine as a result of wind impacting rotor blades (not shown). As rotor 110 turns relative to stator 112, DFIG 108 generates power that is supplied to POCC 104 through a transformer 114. Transformer 114 converts, for example, power generated by DFIG 108 at a relatively lower voltage up to the voltage of POCC 104. POCC 104 is a bus or other conductor for collecting current from DFIGs 108 and delivering it to electric grid 116. Voltage on POCC 104 is stepped-up to transmission line levels on electric grid 116 through a transformer 118. In one embodiment, DFIG 108 may generate power at 6 kilovolt (kV) that is stepped-up to 34.5 kV for supplying to POCC 104. Transmission lines within electric grid 116 may operate at, for example, 110 kV. In such an embodiment, the 34.5 kV voltage on POCC 104 is stepped-up to 110 kV by transformer 118.

Each DFIG 108 includes a bidirectional power converter 120 to enable DFIG 108 to synchronize to electric grid 116 regardless of the speed at which rotor 110 turns, i.e., regardless of wind speed. For example, power generated by each DFIG 108 should be synchronized to the frequency at which electric grid 116 operates, e.g., 50 hertz or 60 hertz. Bidirectional power converter 120 includes a rotor-side converter (RSC) 122 coupled to a line-side converter (LSC) 124 through a DC link 126. RSC 122 and LSC 124 each include one or more switching devices (not shown) controlled by pulse-width modulated switching signals for the purpose of converting AC to DC or DC to AC depending on the operating regime of DFIG 108. Moreover, control of RSC 122 enables further control of reactive power (and real power) fed to electric grid 116 from DFIG 108. Bidirectional power converter 120, when DFIG 108 is operating sub-synchronously, draws power from the line through transformer 114. Generally, control of voltage and current at rotor 110 enables DFIG 108 to synchronize to the frequency of electric grid 116. More specifically, LSC 124 converts the AC power to DC that is regulated by DC link 126. RSC 122 converts DC power from DC link 126 to AC power that is supplied to rotor 110 in a quantity sufficient to synchronize rotation of rotor 110 and, accordingly, the AC power generated at stator 112, to the frequency of electric grid 116. Conversely, when DFIG 108 is operating super-synchronously, AC power is generated at rotor 110 that is supplied to RSC 122, converted to DC regulated by DC link 126, and converted back to AC power by LSC 124 to be supplied to POCC 104 through transformer 114.

In certain embodiments, power generated at stator 112 is at the same voltage as power supplied to the rotor through bidirectional power converter 120, or generated by rotor 110 and supplied back to POCC 104 through bidirectional power converter 120. In such embodiments, transformer 114 may include a two-winding transformer having winding ratios for stepping-up the generation voltage to the voltage on POCC 104. For example, in one such embodiment, the voltages at stator 112 and on the line side of LSC 124 are 6 kV, which is stepped up to, for example 34.5 kV on POCC 104. In alternative embodiments, bidirectional power converter 120 operates at a different voltage, e.g., lower voltage, than the generation voltage at stator 112. For example, in one such embodiment, as shown in FIG. 1, bidirectional power converter 120 operates, on the line side of LSC 124, at 690 V, while stator 112 generates at 6 kV. In such embodiments, transformer 114 includes at least three windings including a first winding 128 coupled to POCC 104, a second winding 130 coupled to stator 112, and a third winding 132 coupled to bidirectional power converter 120.

Figure 3:
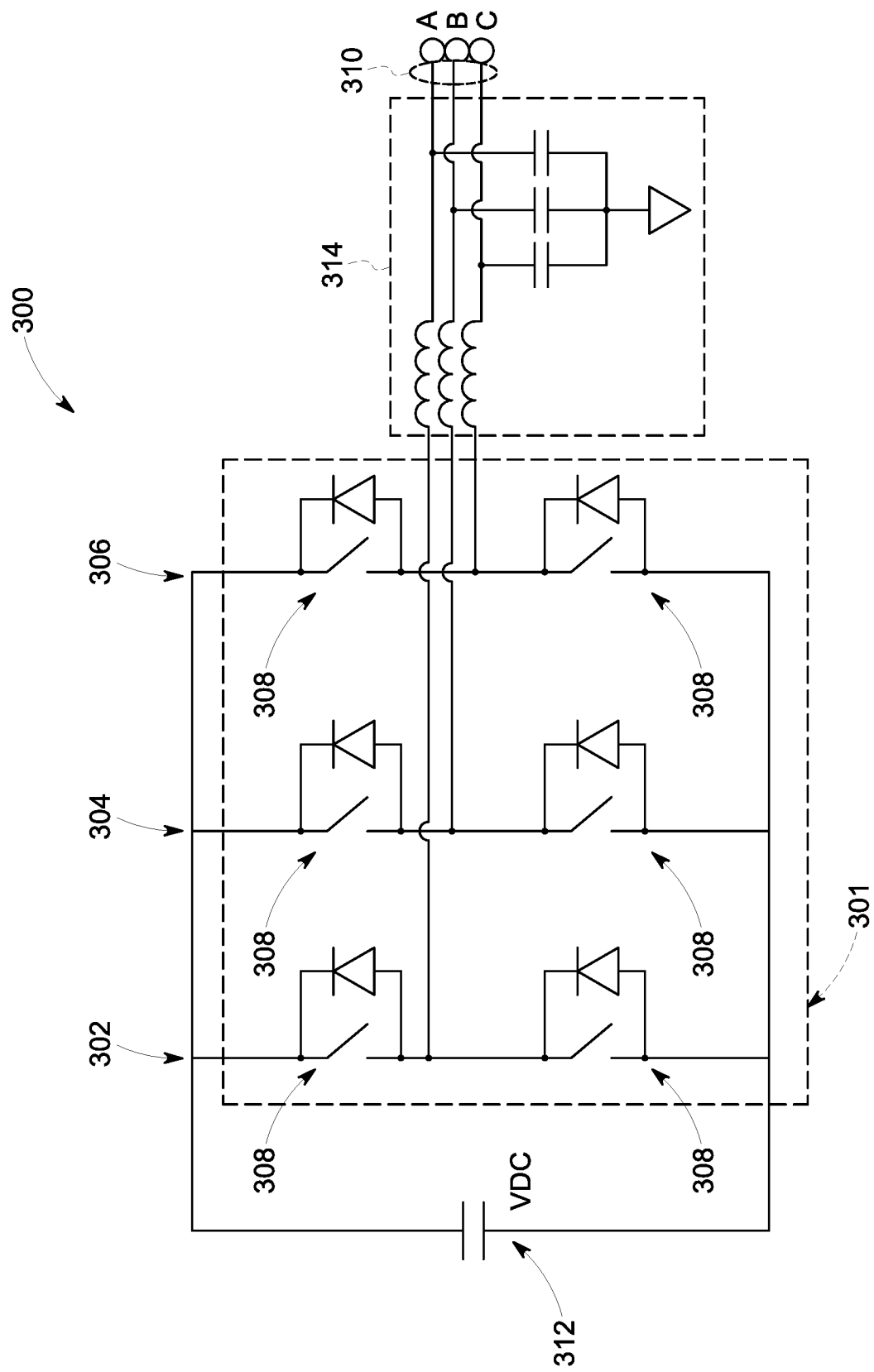
FIG. 3 is a schematic diagram of an exemplary modular VAR compensator for use in the wind farm of FIG. 2.

FIG. 3 is a schematic diagram of an example of one MVB 300 (shown in FIG. 2). MVB 300 includes a bridge converter 301 having three phase legs 302, 304, 306, each of which includes a plurality of semiconductor devices 308 configured to switch the three phases 310 to which MVB 300 is coupled, e.g., the three phases of POCC 104 (shown in FIGS. 1 and 2). Semiconductor devices 308 may include, for example, an insulated-gate bipolar transistor (IGBT) or a metal-oxide semiconductor field-effect transistor (MOSFET). Semiconductor devices 308 are controlled by a processor, e.g., a microcontroller (not shown), using PWM signals. MVB 300 also includes a voltage source 312 (shown as a capacitor in FIG. 3) and a filter 314.

Generally, the functionalities of MVB 300 can also include, without limitation, power factor correction, voltage correction, and compensating for harmonics at the point of connection. Semiconductor devices 308 are controlled to sink reactive power from the line-side, i.e., the three phases 310, when the voltage levels on the three phases 310 exceed the level on voltage source 312. Conversely, semiconductor devices 308 are controlled to source, or supply, reactive power to the three phases 310 when the voltage on voltage source 312 exceeds the voltage levels on the three phases 310. Generally, the VAR compensating capacity of MVB 300 is a function of the power capacity of semiconductor devices 308 and voltage source 312. In certain embodiments, if a sufficient power supply is available to voltage source 312, MVB 300 may also source active power to the three phases 310.

Figure 4:
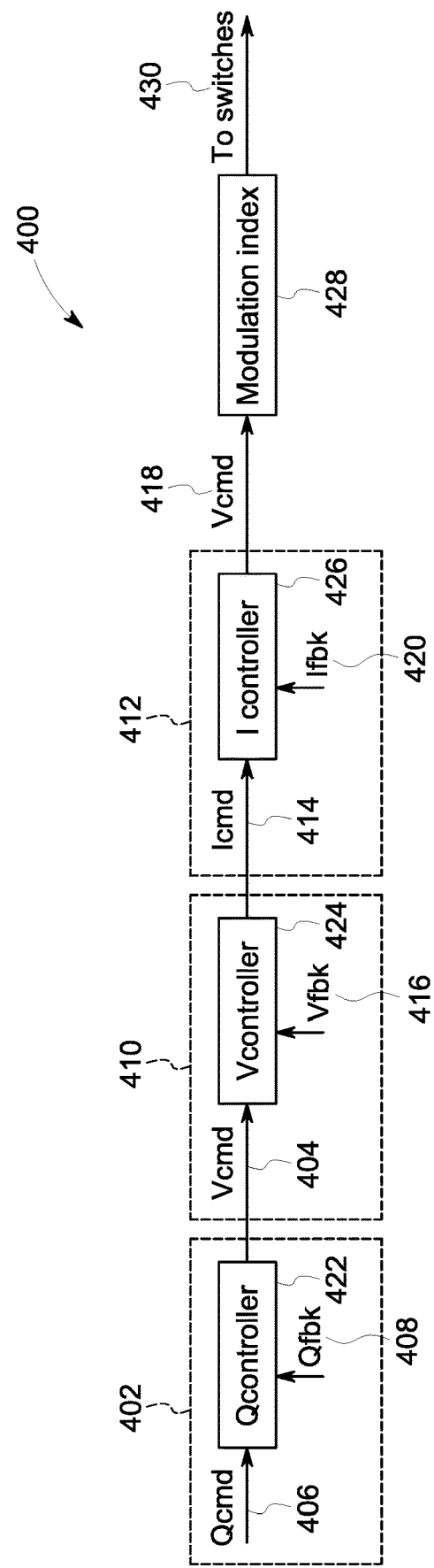
FIG. 4 is a block diagram of an exemplary control loop for the modular VAR compensator of FIGS. 2 and 3.

FIG. 4 is a block diagram of an example control loop 400 for controlling semiconductor devices 308 of MVB 300 (shown in FIGS. 2 and 3). Control loop 400 may be embodied in, for example, a microcontroller (not shown) or one or more other suitable processing devices. Control loop 400 includes an outer (shown on the left of FIG. 4) reactive power control loop 402 that computes a voltage command 404 (Vcmd) based on a reactive power command 406 (Qcmd) and a reactive power feedback 408 (Qfbk). A wind farm controller (not shown) estimates the total reactive power requirement of the farm and allocates the individual reactive power command (Qcmd) to turbines and MVBs 300, based on the grid and turbine operating conditions. Generally, the wind farm controller is a computing system having one or more processors and memory for storing and executing computer executable instructions, or program code, for the purpose of controlling a wind farm. The wind farm controller may be local or remote from one or all wind turbines of the wind farm. For example, the wind farm controller may be integrated within a single wind turbine of the wind farm. In alternative embodiments, the wind farm controller is incorporated into a stand-alone unit of equipment. In another alternative embodiment, the wind farm controller is local to the plurality of MVBs 300 for the wind farm.

Control loop 400, for a given MVB 300, includes an inner voltage control loop 410 followed by an inner current control loop 412. Voltage control loop 410 computes a current command 414 (Icmd) based on voltage command 404 and a voltage feedback 416 (Vfbk). Current control loop 412 computes a voltage command 418 based on current command 414 and a current feedback 420 (Ifbk). Each of reactive power control loop 402, voltage control loop 410, and current control loop 412 is governed by a control module, i.e., Q-controller 422, V-controller 424, and I-controller 426. The control modules may include, for example, a proportional-integral (PI) controller, a DSP, or a microcontroller. The control modules may be implemented as a software module embodied on the microcontroller in which control loop 400 is implemented, or on an independent processing device.

The output from current control loop 412, i.e., voltage command 418, is supplied to a modulation index 428 that translates voltage command 418 to a selected set of PWM signals 430 for controlling semiconductor devices 308 of MVB 300.

Figure 5:
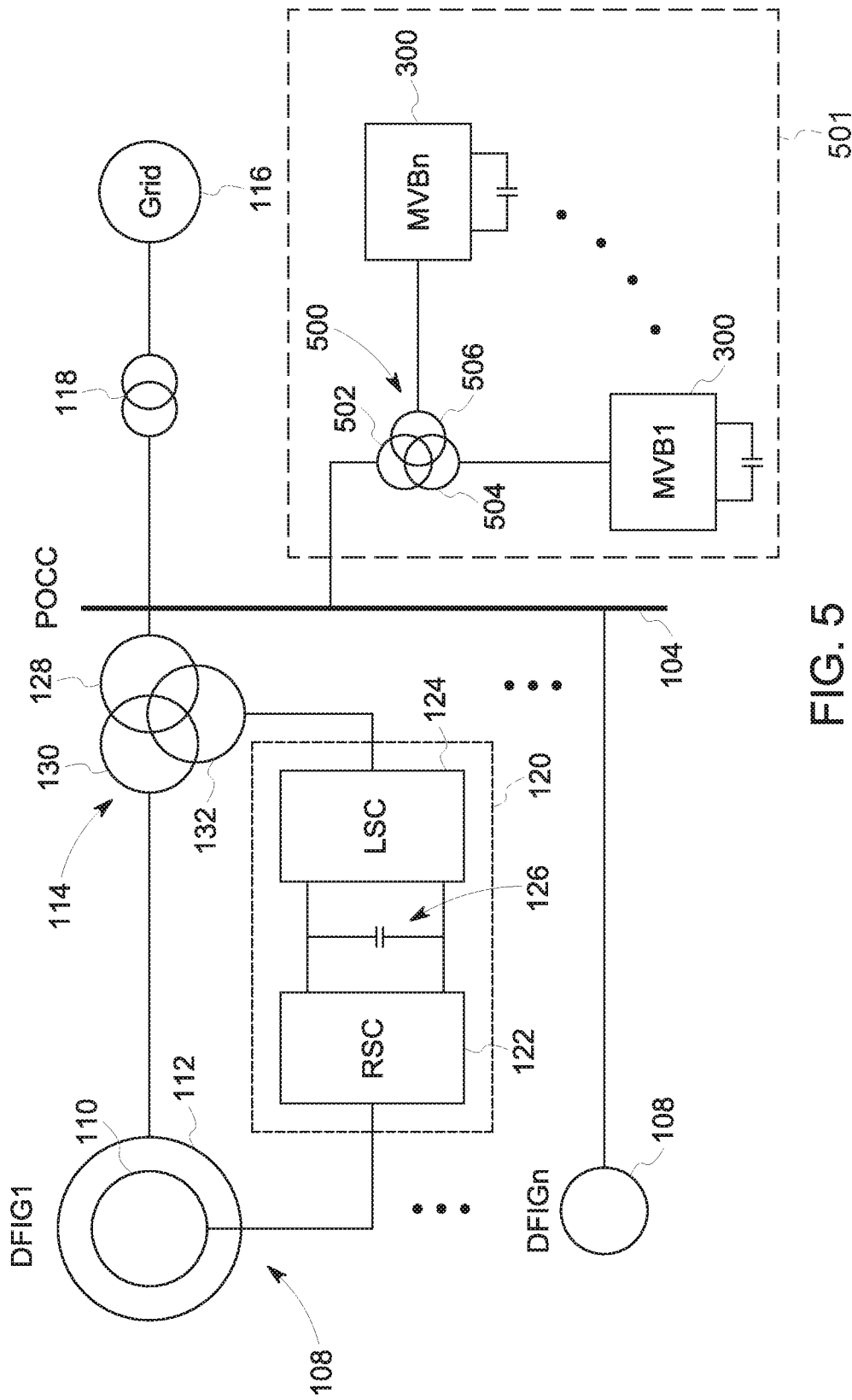
FIG. 5 is a diagram of the wind farm of FIGS. 1 and 2 with a plurality of modular VAR compensators coupled through a multi-winding transformer.

FIG. 5 is a diagram of wind farm 100 (shown in FIGS. 1 and 2) including the plurality of MVBs 300 (shown in FIG. 2) coupled to POCC 104 through a multi-winding transformer 500 to form a system 501 of reactive power compensators. Multi-winding transformer 500 includes a primary winding 502 coupled to POCC 104 and two or more secondary windings 504, 506 coupled to respective MVBs 300. Each secondary winding (e.g., secondary windings 504 and 506) of multi-winding transformer 500 is dedicated to a single MVB 300 operating independently with its own control loop 400.

The leakage inductance of multi-winding transformer 500 enables a high-impedance path to high-frequency circulating current and reduces the occurrence of reactive power oscillations.

Figure 6:
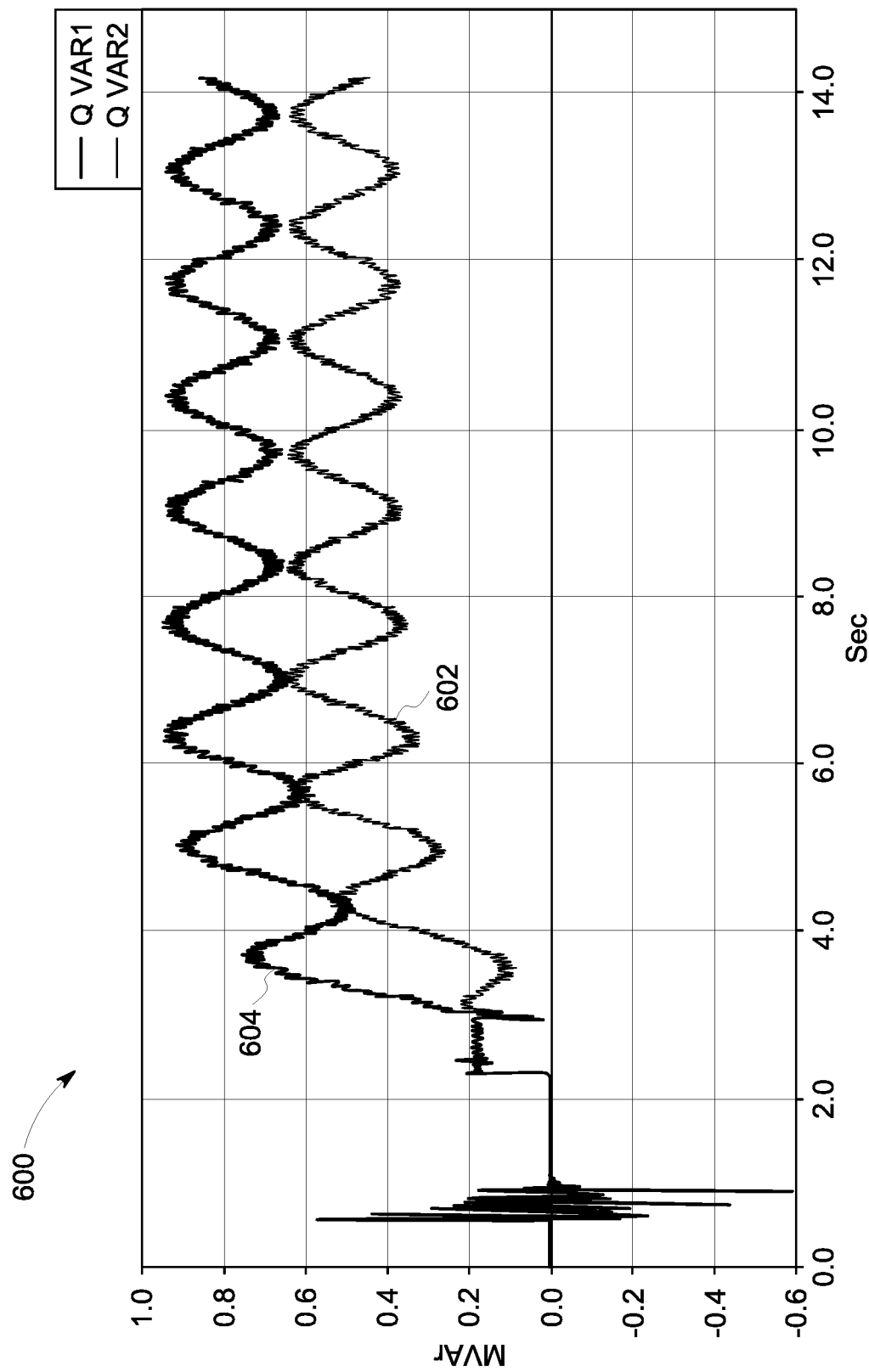
FIG. 6 is a graph of reactive power plots for two modular VAR compensators of the plurality of modular VAR compensators of FIG. 2.
Figure 7:
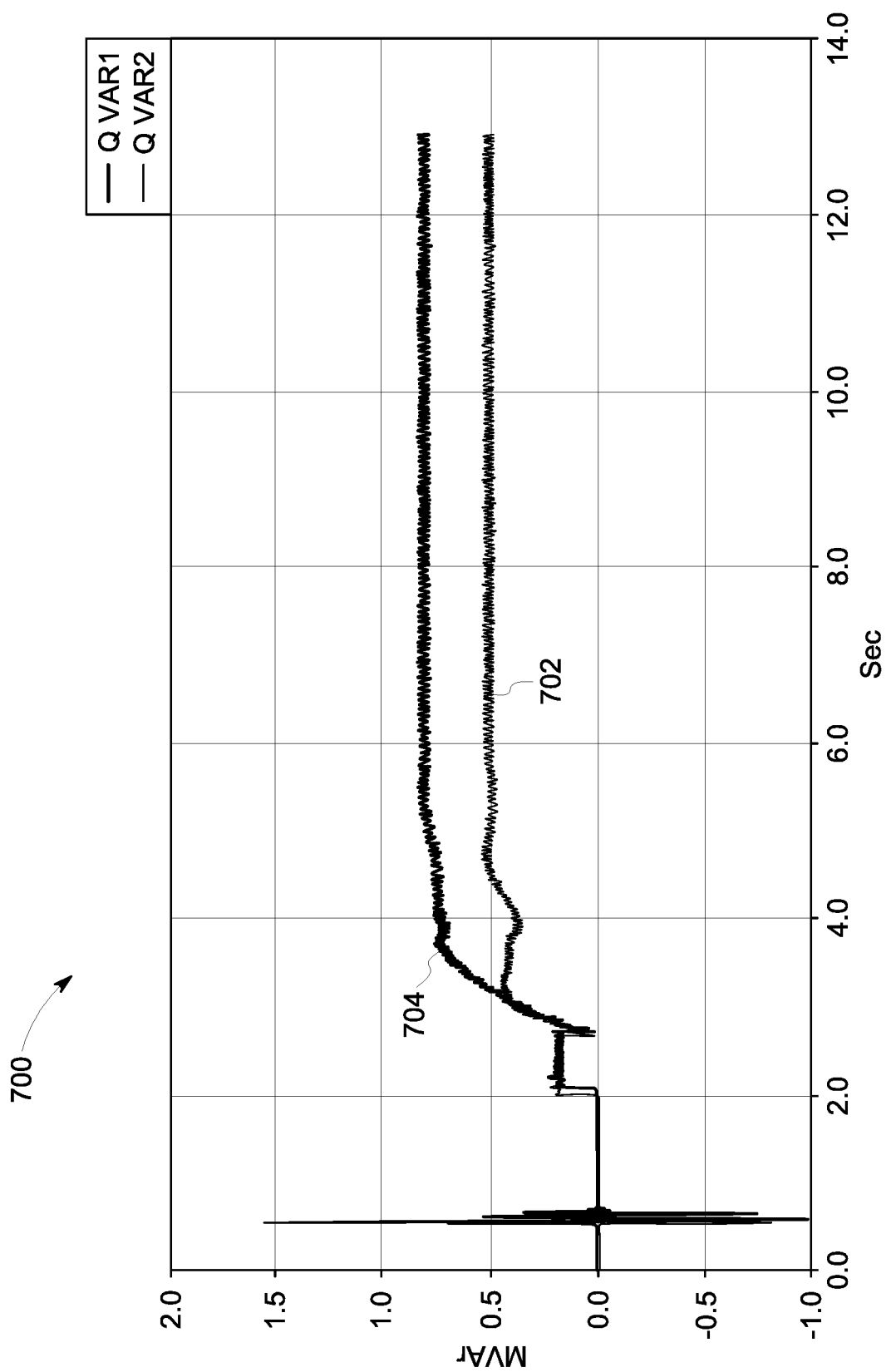
FIG. 7 is a graph of reactive power plots for two modular VAR compensators of the plurality of modular VAR compensators of FIG. 5.

FIG. 6 is a graph 600 including a reactive power plot 602 for a first MVB and a reactive power plot 604 for a second MVB, where the first and second MVBs are coupled, for example, to POCC 104 through transformer 106 (both shown in FIG. 2). FIG. 7 is a graph 700 including an example reactive power plot 702 for a first MVB and an example reactive power plot 704 for a second MVB, where the first and second MVBs are coupled to POCC 104 through respective windings of multi-winding transformer 500 (shown in FIG. 5). Reactive power plots 602, 604, 702, and 704 are graphed as reactive mega-volt-amps (MVAR) shown on a vertical axis versus time (seconds) shown on a horizontal axis.

Graph 600 illustrates interaction between control loops of the first and second MVBs, because each is attempting to control the voltage on the secondary side of transformer 106.

Consequently, reactive power plots 602 and 604 oscillate about the set points, or reactive power commands, for the first and second MVBs. For example, in graph 600, the first MVB is operating with a kVAR set point of 500 kVAR, and the second MVB is operating with a kVAR set point of 800 kVAR. Conventionally, the oscillatory reactive power response of the first and second MVBs is overcome with additional communication and coordination among the MVBs and, more specifically, their respective control loops. For example, the first MVB may be configured as a master and the second MVB may be configured as a slave.

Graph 700 illustrates the isolation of the control loops of the first and second MVBs, because each MVB is coupled to POCC 104 through a dedicated winding (e.g., secondary winding 504, 506) of multi-winding transformer 500. As in graph 600, the first MVB is operating with a kVAR set point of 500 kVAR, and the second MVB is operating with a kVAR set point of 800 kVAR. Accordingly, reactive power plots 702 and 704 quickly converge on their respective kVAR set points.

Figure 8:
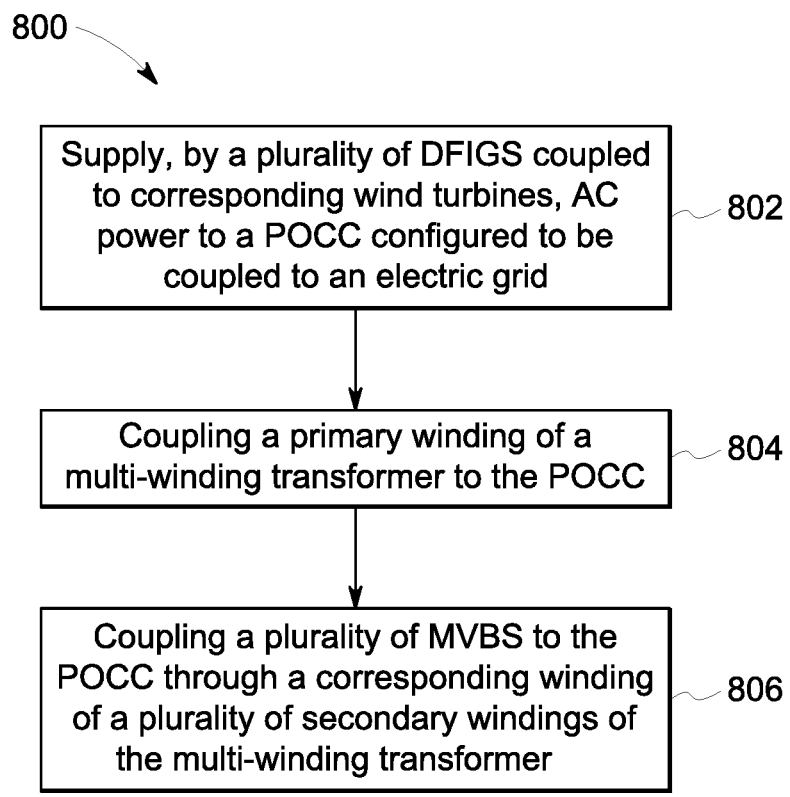
FIG. 8 is a flow diagram of an exemplary method of operating the wind farm of FIG. 5.

FIG. 8 is a flow diagram of an exemplary method 800 of operating wind farm 100 (shown in FIG. 5). The plurality of DFIGs 108, when turned by corresponding wind turbines to which they are coupled, supplies 802 AC power to POCC 104. POCC 104 supplies power to electric grid 116 through transformer 118.

Multi-winding transformer 500 and, more specifically, primary winding 502 is coupled 804 to POCC 104. MVBs 300 are coupled 806 to POCC 104 through corresponding secondary windings, such as secondary windings 504 and 506.

In certain embodiments, method 800 further includes executing, on a microcontroller for each of MVBs 300, control loop 400 to control switching of semiconductor devices within each MVB 300. For example, a wind farm controller estimates a total reactive power requirement for the wind farm and allocates at least a portion of the total reactive power requirement among the MVBs 300. Allocations are made based on conditions on electric grid 116 and for each wind turbine. The microcontroller for each MVB 300 receives an individual reactive power command according to which control loop 400 is executed. The individual reactive power commands are based on, or result from, the allocations made by the wind farm controller.

The above-described embodiments of the systems and methods described herein provide an architecture for connecting a system of MVBs without additional communication among the MVBs. The systems and methods described herein provide integration of multiple MVBs through a multi-winding transformer coupled between the POCC and each MVB. More specifically, each MVB couples to the POCC through its own winding of the multi-winding transformer. In certain embodiments, the voltage on the POCC is stepped-down by the multi-winding transformer to an operating voltage for the multiple MVBs. The leakage inductance of the multi-winding transformer avoids circulating current and isolates and stabilizes the internal control loops of each MVB, and avoids reactive power oscillations.

An exemplary technical effect of the methods, systems, and apparatus described herein includes at least one of: (a) coupling of MVBs to a POCC through a dedicated winding of a multi-winding transformer; (b) reducing communication among MVBs in a system of VAR compensators; (c) reducing circulating currents in a system of VAR compensators; (d) reducing oscillations in reactive power in a system of VAR compensators; and (e) reducing complexity of systems of MVBs.

Exemplary embodiments of methods, systems, and apparatus for systems of VAR compensators are not limited to the specific embodiments described herein, but rather, components of systems and/or steps of the methods may be utilized independently and separately from other components and/or steps described herein. For example, the methods may also be used in combination with other VAR compensators, and are not limited to practice with only the systems and methods as described herein. Rather, the exemplary embodiment can be implemented and utilized in connection with many other applications, equipment, and systems that may benefit from reduced cost, reduced complexity, commercial availability, improved manufacturability, and reduced product time-to-market.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system of reactive power compensators for a wind farm, said system comprising:
    a wind turbine;
    a doubly-fed induction generator (DFIG) coupled to said wind turbine and configured to generate alternating current (AC) power to be supplied to a point of common coupling (POCC) for the wind farm;
    a multi-winding transformer comprising:
        a primary winding configured to be coupled to the POCC upstream from a grid-side step-up transformer; and
        a plurality of secondary windings; and
    a plurality of modular reactive power compensators (MVBs) each coupled to a dedicated one of said plurality of secondary windings, wherein said plurality of MVBs are integrated with the POCC via the single primary winding upstream of the grid-side step-up transformer.

2. The system of claim 1, wherein said primary winding comprises a greater number of turns than each of said plurality of secondary windings.

3. The system of claim 1, wherein each of said plurality of MVBs comprises a voltage source and a bridge converter coupled between said voltage source and said corresponding winding of said plurality of secondary windings.

4. The system of claim 3, wherein each of said plurality of MVBs comprises a microcontroller configured to execute a control loop to control switching of semiconductor devices within said bridge converter.

5. The system of claim 4, wherein the control loops of said plurality of MVBs execute independent of each other.

6. The system of claim 4, wherein the control loop for each of said plurality of MVBs is a reactive power control loop.

7. The system of claim 4, wherein the control loop for each of said plurality of MVBs is a voltage control loop.

8. The system of claim 4, wherein the control loop for each of said plurality of MVBs is a current control loop.

9. A wind farm comprising:
- a point of common coupling (POCC) configured to be coupled to an electric grid, the electrical grid having a grid-side step-up transformer downstream of the POCC;
- a plurality of doubly-fed induction generators (DFIGs) configured to generate alternating current (AC) power to be supplied to said POCC;
- a multi-winding transformer connected to the POCC comprising:
   - a primary winding configured to be coupled to said POCC; and
   - a plurality of secondary windings; and
- a plurality of modular reactive power compensators (MVBs), each of said plurality of MVBs coupled to a dedicated one of said plurality of secondary windings, wherein said plurality of MVBs are integrated with the POCC via the single primary winding upstream of the grid-side step-up transformer.

10. The wind farm of claim 9, wherein said multi-winding transformer comprises a step-down transformer from said primary winding to each of said plurality of secondary windings.

11. The wind farm of claim 9, wherein each DFIG of said plurality of DFIGs comprises a bidirectional power converter configured to regulate voltage and current at a rotor of each DFIG to synchronize AC power generated by the plurality of DFIGs to a frequency of the electric grid.

12. The wind farm of claim 9, wherein each of said plurality of MVBs comprises a voltage source and a bridge converter coupled between said voltage source and said corresponding winding of said plurality of secondary windings.

13. The wind farm of claim 12, wherein each of said plurality of MVBs comprises a microcontroller configured to execute a control loop to control switching of semiconductor devices within said bridge converter.

14. The wind farm of claim 13, wherein the control loops of said plurality of MVBs execute independent of each other.

15. A method of operating a wind farm, said method comprising:
- supplying, by a plurality of double-fed induction generators (DFIGs) coupled to corresponding wind turbines, alternating current (AC) power to a point of common coupling (POCC) configured to be coupled to an electric grid upstream of a grid-side step-up transformer;
- coupling a primary winding of a multi-winding transformer to the POCC; and
- coupling a plurality of modular reactive power compensators (MVBs) to the POCC through a dedicated one of a plurality of secondary windings of the multi-winding transformer, wherein the plurality of MVBs are are integrated with the POCC via the single primary winding upstream of the grid-side step-up transformer.

16. The method of claim 15 further comprising executing, on a microcontroller for each MVB of the plurality of MVBs, a control loop to control switching of semiconductor devices within each MVB.

17. The method of claim 16 further comprising:
- estimating, by a wind farm controller, a total reactive power requirement for the wind farm; and
- allocating, by the wind farm controller, at least a portion of the total reactive power requirement among the plurality of MVBs based on conditions of the electric grid and conditions of the corresponding wind turbines.

18. The method of claim 17 further comprising:
- receiving, at the microcontroller for each MVB of the plurality of MVBs, an individual reactive power command based on the allocating by the wind farm controller; and
- executing, by the microcontroller for each MVB, a reactive power control loop based on the individual reactive power command.

\* \* \* \* \*